United States Patent [19]

Courtenay

[11] 4,130,360
[45] Dec. 19, 1978

[54] LASER ALTIMETER/PROFILOMETER APPARATUS

[75] Inventor: Terence H. Courtenay, Ste-Foy, Canada

[73] Assignee: Her Majesty the Queen in right of Canada, as represented by the Minister of National Defence, Ottawa, Canada

[21] Appl. No.: 760,037

[22] Filed: Jan. 17, 1977

[51] Int. Cl.$^2$ .............................................. G01C 3/08
[52] U.S. Cl. ........................................ 356/4; 343/9; 343/12 A; 356/1; 356/5; 356/28
[58] Field of Search ............................ 356/1, 4, 5, 28; 343/12 A, 9

[56] References Cited

U.S. PATENT DOCUMENTS

| | | | |
|---|---|---|---|
| 3,525,568 | 8/1970 | Dreyfus | 356/28 |
| 3,528,741 | 9/1970 | Benson et al. | 356/28 |
| 3,811,774 | 5/1974 | Honeycutt et al. | 356/5 |
| 3,895,384 | 7/1975 | Fathauer et al. | 343/9 |
| 3,958,881 | 5/1976 | Keene et al. | 356/28 |

Primary Examiner—S. C. Buczinski
Attorney, Agent, or Firm—James C. Wray

[57] ABSTRACT

Laser altimeter/profilometer apparatus utilizing a CW $CO_2$ laser transmitter mounted on an aircraft so as to transmit a narrow laser beam towards the terrain below the aircraft. The scattered laser signals are received in a receiver mounted on the aircraft, some distance along the fuselage from the transmitter, and the doppler shift in frequency of the received signal is determined. That doppler shifted frequency is utilized to calculate the altitude of the aircraft above the ground over which it is flying.

18 Claims, 2 Drawing Figures

LASER ALTIMETER/PROFILOMETER APPARATUS

BACKGROUND OF THE INVENTION

This invention relates to laser apparatus.

The invention is particularly concerned with apparatus for determining the distance of a moving object from a particular area. For example, an aircraft often requires to determine its altitude with precision and sometimes the vertical profile of the terrain over which the aircraft flies is required. In northern regions of Canada, whiteout conditions are encountered and the pilot of an aircraft needs reliable information as to the vertical profile of the terrain before landing on an unknown, unprepared site, if he cannot obtain an adequate assessment by direct observation. Furthermore, accurate information is also required for mapping and survey operations from the air.

DESCRIPTION OF THE PRIOR ART

It is well known to use radio and radar altimeters to obtain a measurement of an aircraft's altitude. More recently, pulsed laser radar apparatus has been used to determine the altitude and terrain profile by measuring the time delay between a downwardly transmitted pulse from a transmitter located on the aircraft and the returning echo signal which is received by reflection from the ground directly underneath the aircraft.

As will be apparent, a very narrow radio or radar beam cannot be produced without a large antenna being carried by the aircraft and this is, of course, relatively impracticable. Furthermore, the area of ground which reflects the signal is quite large and the altitude measured is some value between the highest and the lowest value of altitude within this area. This method has been found therefore to lack the desired precision. In order to overcome the disadvantages of such systems, pulsed laser apparatus has been used but such apparatus is limited in repetition rate and therefore the number of separate height measurements which can be made per unit distance is limited, especially for pulsed laser apparatus which operates at the longer infrared wavelengths having a better ability to penetrate haze and fog. The precision of height measurement is also limited because the length of the laser pulse in space is ordinarily several meters and only one observation is made for each height and thus the precision of measurement of the terrain profile is in the order of meters. as opposed to the desired precision of decimeters and centimeters.

OBJECTS OF THE INVENTION

It is an object of the present invention to provide apparatus for determining the distance of an object from a particular area which is capable of providing greater precision than the above-mentioned radio or radar beam apparatus and also has advantages over the above-mentioned proposed pulsed laser apparatus.

SUMMARY OF THE INVENTION

Accordingly, the present invention provides apparatus located on a moving object for determining its distance from a particular area, comprising a CW laser transmitter for directing a narrow CW laser beam towards said area, a laser receiver for receiving resultant signals reflected from said area, first means for heterodyning the received signals with at least a part of the transmitter laser beam output signals to determine the optical doppler frequency by which the received signals are doppler shifted with respect to the frequency of the transmitter laser beam output signals, and second means for utilizing the determined signals at the optical doppler frequency to calculate the distance of said moving object from said area.

BRIEF DESCRIPTION OF THE DRAWINGS

An embodiment of the present invention will now be described, by way of example, with reference to the accompanying drawings in which:

Referring to FIG. 1, an aircraft 2 is illustrated as flying over a terrain 4. The aircraft is provided with a laser transmitter 6 and a laser receiver 8.

DETAILED DESCRIPTION OF THE PREFERRED EMBODIMENT

Figure 1:
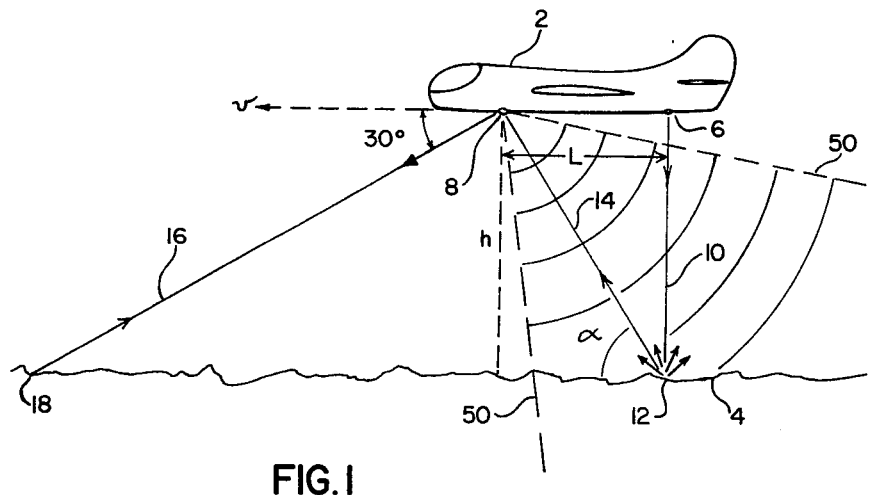
FIG. 1 is a diagrammatic representation of an aircraft flying over a particular terrain.

In order to determine the altitude, h, of the aircraft above the terrain 4, the laser transmitter 6 transmits a very narrow CW laser beam vertically downwards from the aircraft. The transmitted beam is identified in FIG. 1 by the numeral 10 and is incident on the ground or terrain 4 at spot 12. The laser energy is scattered in all directions from the small illuminated spot 12 which is only a few centimeters in diameter. Some of the energy scattered, i.e. reflected, from the spot 12 travels along the indicated path 14 and is received by the receiver 8 in the aircraft 2. It will be assumed that the distance between the receiver 8 and the transmitter 6 in the aircraft is a distance L along the fuselage. The receiver 8 is designed to have a wide field of view in the vertical plane and is so mounted that whatever the height h of the aircraft, the receiver "sees" the energy scattered by the illuminated spot 12 on the ground 4, i.e., reflected energy is always received by the receiver. In order to determine how the apparatus according to the present invention may calculate the height h of the receiver above the ground 4, let it be assumed that the line 14 joining the receiver 8 to the illuminated spot 12 is at an angle α to the horizontal. The frequency of the laser energy entering the receiver 8 is, as will be apparent, doppler shifted by a frequency given by the formula $$F_d = /f_d - f_o/ = \frac{v}{\lambda} \cos\alpha \qquad (1)$$

where $f_d$ is the optical frequency of the doppler shifted return signal, $f_o$ is the optical frequency of the laser, v is the velocity of the aircraft and λ is the laser wavelength. This frequency may be extracted by heterodyning the return signal at $f_d$ with a small portion of the laser output at $f_o$ in the detector (not shown) of the receiver. This angle is related to the height h of the receiver in the following manner:

$$\cos\alpha = \frac{L}{(h^2 + L^2)^{\frac{1}{2}}}$$

Thus $$F_d = \frac{vL}{\lambda} (h^2 + L^2)^{-\frac{1}{2}} \qquad (2)$$

and $$h = L[(\frac{v}{\lambda F_d})^2 - 1]^{\frac{1}{2}} \tag{3}$$

It may be shown that:

$$\left|\frac{\Delta F_d}{F_d}\right| = \Delta h \left(\frac{h}{h^2 + L^2}\right) \tag{4}$$

If $F_d$ is measured by counting cycles, then $F_d/\Delta F_d$ cycles must be counted if a precision of $\Delta h$ is required. The time required to count this number of cycles is $1/\Delta F_d$ seconds.

The distance travelled by the aircraft in this time is:

$$\Delta l = \frac{v}{\Delta F_d} \tag{5}$$

$$= \frac{\lambda}{L} \frac{(h^2 + L^2)^{3/2}}{h\Delta h}$$

$\Delta h$ is the minimum resolvable change in h and $\Delta l$ is the minimum distance between measurements, along the surface, $\Delta F_d$ being the corresponding frequency change. Suppose $\Delta l = k\Delta h$, k being a constant, then it follows that $$\Delta h = \frac{(h^2 + L^2)^{\frac{3}{4}}}{h^{\frac{1}{2}}} \cdot \frac{\lambda^{\frac{1}{2}}}{kL} \tag{6}$$

To take an example, suppose a CW $CO_2$ laser is used, $\lambda = 10^{-5}$ meter, and L = 5 meters, and assume an aircraft velocity of 60 meters sec$^{-1}$. The table shows the doppler shift $F_d$, and also $\Delta h$ for two values of k.

TABLE

| Height h meters | Doppler shift $F_d$ MHz | Height resolution $\Delta h$ cm | |
|---|---|---|---|
| | | K = 2 | K = 4 |
| 1 | 5.88 | 1.2 | 0.6 |
| 7 | 3.46 | 0.95 | 0.48 |
| 10 | 2.68 | 1.2 | 0.6 |
| 20 | 1.46 | 2.1 | 1.05 |
| 50 | 0.597 | 5.0 | 2.5 |
| 100 | 0.299 | 10 | 5.0 |
| 200 | 0.150 | 20 | 10 |
| 300 | 0.100 | 30 | 15 |

As will be known, an absolute measurement of the height h depends on a knowledge of the forward speed v of the aircraft relative to the ground 4, but measurement of airspeed may not be sufficiently accurate. In this case the ground speed v may be measured by directing a laser beam 16, derived from the same laser, directly ahead or astern of the aircraft at a known depression angle, e.g. 30°. The signal scattered from the spot 18 on the ground 4 is received in a particular heterodyne receiver which is co-axial with the transmitted beam 16. As will be apparent, the received signal is doppler shifted and the doppler shift frequency is given by the formula $$F_d' = |f_d - f_o| = \frac{2v}{\lambda} \cos 30° = \frac{v\sqrt{3}}{\lambda} \tag{7}$$

Using formulas (3) and (7), we derive $$h = L\left[\frac{1}{3}\left(\frac{F_d}{F_d'}\right)^2 - 1\right]^{\frac{1}{2}} \tag{8}$$

From the above calculations for formula (8) it will be seen that the height h may be evaluated from the ratio of the two doppler shifts in frequencies. A small onboard computer in the aircraft can be utilized to make the required calculation and the period over which the frequency $F_d$ is measured can be adjusted according to the equations (4) and (6) once the height h has been measured, so that the selected precision of measurement is obtained for the height of the aircraft above the ground. The rms value of height variations of the ground profile can be evaluated and any high points determined. If, in a given run over a proposed landing area, these exceed some maximum permissible value, means can be provided on the aircraft to provide an audible warning to the pilot. It will also be apparent that the height can be continuously displayed on a display means in the aircraft, but audible tones are considered to be preferable for these functions because the pilot is then left free to concentrate on visual observation.

It has been shown that by using a CW $CO_2$ laser sufficient frequency stability can be obtained to provide a doppler frequency resolution of 2000 Hz from an altitude of 1000 meters. Thus, according to the present invention, one can construct an altimeter capable of indicating the height of the aircraft above the ground as well as a profilometer capable of indicating the profile of the ground over which the aircraft is flying. Analysis has shown that for height resolutions given in the table above, the necessary frequency resolutions can be obtained with a stabilized CW $CO_2$ laser.

Figure 2:
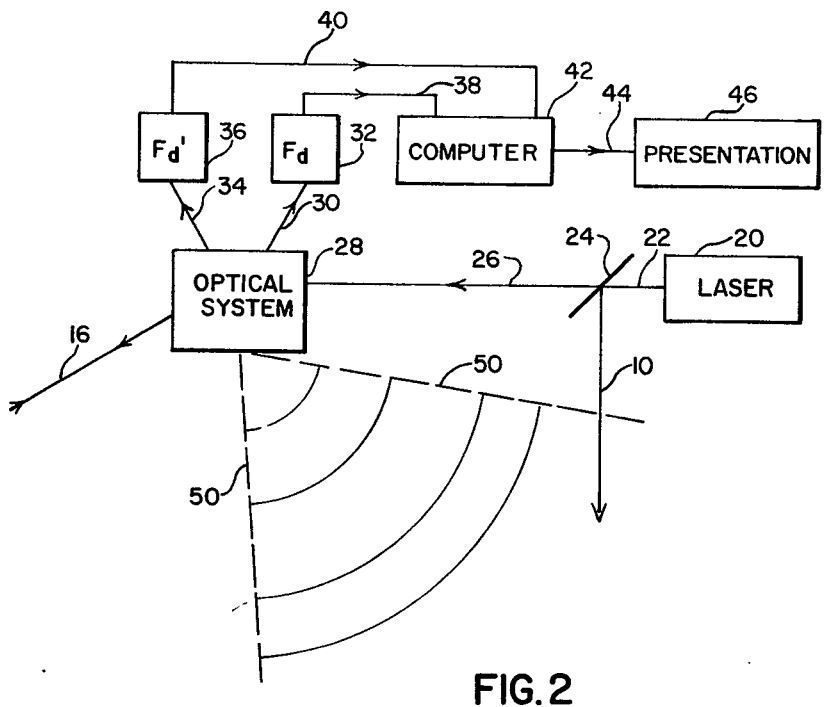
FIG. 2 is a block schematic diagrammatic representation of apparatus according to the present invention.

In FIG. 2 a diagrammatic representation of the apparatus according to the present embodiment of the present invention is shown and it will be seen that a laser 20 emits a laser beam 22 which is incident on a semi-reflector device 24 whereby beam 10 is transmitted downwards whilst a further beam 26 passes through to an optical system 28. The optical system 28 is part of the receiver apparatus 8 (FIG. 1) and causes the beam 16 to be transmitted as shown. The optical system 28 is also effective to provide the doppler frequency signals at frequencies $F_d$ and $F_d'$ as required to perform the calculations of formula (8). The doppler frequency signal $F_d$ is passed along path 30 to unit 32 whilst the doppler frequency signal $F_d'$ is provided along path 34 to unit 36. Respective signals 38 and 40 are then fed to a computer unit 42 as will be seen from FIG. 2. Computer unit 42 then makes the required calculations according to formula (8) and a presentation signal is fed along path 44 to the presentation unit 46 whereby the required information is given to the pilot, preferably by audible tones as mentioned above.

It was previously stated that the receiver 8 of FIG. 1 had a relatively wide field of view in a vertical plane and this is represented in FIGS. 1 and 2 by the broken lines 50.

With the described embodiment of the invention it will be appreciated that the apparatus may be utilized as an altimeter for the aircraft and also may be utilized to measure the profile of the terrain 4 in a thin line directly below the aircraft. Several flight passes may be made over the same territory to obtain samples of the profile before making a decision to land, if this is desired. Alternatively, at the cost of further complexity, the laser beam can be expanded to a fan beam normal to the direction of flight and an array of detector devices can then be used in the receiver 8, with a suitable optical system 28 so that each detector device has a wide field of view in a vertical plane which is rotated about a vertical axis through the receiver 8 so that it sees only scattered energy from a small part of the illuminated transverse line on the ground 4. In this way $n$ parallel profiles of the terrain can be measured simultaneously, where $n$ is the number of detector devices.

The method of determining the forward speed of the aircraft utilizing the further transmitted laser beam 16 (FIG. 1) is particularly advantageous and appears to be more accurate than using the normal airspeed indicator. Since equation (8) is used to determine the height h, the ratio $F_d'/F_d$ is utilized and therefore any noise frequency modulation on the laser carrier affects both $F_d$ and $F_d'$ in the same proportion so that their ratio is relatively unaffected. The accuracy of the system is thereby improved and also relaxes somewhat the tolerance on the frequency stability of the laser.

It will also be appreciated that the present invention may be utilized, with a large number of detector devices, to provide a precision surveillance system, whereby the profile information from all the detector devices could be used to form a three-dimensional display. If the high resolution theoretically obtainable can be realized in practice, military targets such as vehicles and guns could be identified by a low-flying aircraft at night or in conditions of poor visibility. It will furthermore be appreciated that the use of a CW laser in apparatus according to the present invention is not restricted to aircraft and other uses will be readily apparent for the described laser apparatus.

While the present invention has been particularly set forth in terms of specific embodiments thereof, it will be understood in view of the present disclosure, that numerous variations upon the invention are now enabled to those skilled in the art, which variations yet reside within the scope of the present invention. Accordingly, the invention is to be broadly construed and limited only by the scope and spirits of the claims now appended hereto.

I claim:

1. Apparatus located on a moving object for determining its distance from a point in a reflecting surface, comprising:
   (a) an unmodulated CW laser transmitter for directing a narrow CW laser beam towards said surface,
   (b) a laser receiver for receiving resultant signals reflected for said surface,
   (c) first means for heterodyning the received signals with at least a part of the transmitter laser beam output signals to determine the optical doppler frequency by which the received signals are doppler shifted with respect to the frequency of the transmitter laser beam output signals, said optical doppler frequency being determined from the angle $\alpha$ between a reference line and an imaginary line joining said surface and said receiver said transmitter and said receiver being a fixed distance apart, and
   (d) second means for utilizing the determined signals at the optical doppler frequency to calculate the distance of said moving object from said surface.

2. Apparatus according to claim 1 wherein the CW laser transmitter uses a CW $CO_2$ laser.

3. Apparatus located on a moving object for determining its distance from a particular area, comprising:
   (a) a CW laser transmitter for directing a narrow CW laser beam towards said area,
   (b) a laser receiver for receiving resultant signals reflected from said area,
   (c) first means for heterodyning the received signals with at least a part of the transmitter laser beam output signals to determine the optical doppler frequency by which the received signals are doppler shifted with respect to the frequency of the transmitter laser beam output signals, and
   (d) second means for utilizing the determined signals at the optical doppler frequency to calculate the distance of said moving object from said area, and wherein:
   (e) the received signals are at a frequency $f_d$,
   (f) the transmitter laser beam output signals are at a frequency $f_o$,
   (g) the optical doppler frequency is $F_d = |f_d - f_o| = (v/\lambda)\cos\alpha$ where v is the velocity of the moving object, $\lambda$ is the laser wavelength, and $\alpha$ is the angle between a reference line and an imaginary line joining said area and said receiver, said reference line being at right angles to a line joining the transmitter to said area,
   (h) said distance of said moving object from said area is represented by h, and
   (i) said second means utilizes said optical doppler frequency signals to calculate said distance h according to the formula $h = L[(V/\lambda F_d)^2 - 1]^{\frac{1}{2}}$ where L is the distance between the CW laser transmitter and the laser receiver along the direction of travel of the moving object.

4. Apparatus located on an aircraft flying over a particular terrain for determining its height above the terrain, comprising:
   (a) an unmodulated CW laser transmitter for directing a narrow CW laser beam towards said terrain,
   (b) a laser receiver for receiving resultant signals reflected from said terrain,
   (c) first means for heterodyning the received signals with at least a part of the transmitter laser beam output signals to determine the optical doppler frequency by which the received signals are doppler shifted with respect to the frequency of the transmitter laser beam output signals, said optical doppler frequency being determined from the angle $\Delta$ between a reference line and an imaginary line joining said terrain and said receiver, said transmitter and said receiver being a fixed distance apart, and
   (d) second means for utilizing the determined signals at the optical doppler frequency to calculate the distance of said aircraft above said terrain.

5. Apparatus according to claim 4 wherein the CW laser transmitter uses a CW $CO_2$ laser.

6. Apparatus according to claim 4 wherein the transmitted laser beam is expanded to a fan beam and an array of detector units is provided in said receiver with corresponding optical units whereby each detector has a wide field of view in a vertical plane.

7. Apparatus according to claim 4 including a plurality of detector units provided in said receiver whereby profile information is obtained of one or more objects on the terrain over which the aircraft is flying.

8. Apparatus according to claim 4 including means for directing a further laser beam downwards along the flight path at a known depression angle towards said terrain, receiving a portion of the resultant scattered, reflected, signal in a receiver co-axial with said further laser beam, and means for utilizing the doppler shift frequency $F_d'$ of said resultant reflected signal to calculate said distance h of said aircraft according to the formula:

$$h = L[\tfrac{1}{4}(F_d'/F_d)^2 - 1]^{\tfrac{1}{2}}$$

where $F_d$ is said optical doppler frequency and L is the transmitter receiver spacing.

9. Apparatus according to claim 8 wherein the CW laser transmitter uses a CW $CO_2$ laser.

10. Apparatus according to claim 9 wherein the transmitted laser beam is expanded to a fan beam and an array of detector units is provided in said receiver with corresponding optical units whereby each detector has a wide field or view in a vertical plane.

11. Apparatus according to claim 9 including a plurality of detector units provided in said receiver whereby profile information is obtained of one or more objects on the terrain over which the aircraft is flying.

12. Apparatus according to claim 8 wherein the transmitted laser beam is expanded to a fan beam and an array of detector units is provided in said receiver with corresponding optical units whereby each detector has a wide field or view in a vertical plane.

13. Apparatus according to claim 8 including a plurality of detector units provided in said receiver whereby profile information is obtained of one or more objects on the terrain over which the aircraft is flying.

14. Apparatus according to claim 8 wherein the further laser beam, is transmitted directly ahead of the aircraft at said depression angle.

15. Apparatus located on an aircraft flying over a particular terrain for determining its height above the terrain, comprising:

(a) a CW laser transmitter for directing a narrow CW laser beam towards said terrain, (b) a laser receiver for receiving resultant signals reflected from said terrain, (c) first means for heterodyning the received signals with at least a part of the transmitter laser beam output signals to determine the optical doppler frequency by which the received signals are doppler shifted with respect to the frequency of the transmitter laser beam output signals, and (d) second means for utilizing the determined signals at the optical doppler frequency to calculate the distance of said aircraft above said terrain, and wherein:

(e) the received signals are at a frequency $f_d$.

(f) the transmitter laser beam output signals are at a frequency $f_o$, (g) the optical doppler frequency is $F_d = |f_d - f_o| = v/\lambda \cos\alpha$ where v is the velocity of the aircraft, $\lambda$ is the laser wavelength, and $\alpha$ is the angle between a reference line and an imaginary line joining said terrain and said receiver, said reference line being at right angles to a line joining the transmitter to said terrain, (h) said distance of said aircraft from said terrain is represented by h, and (i) said second means utilizes said optical doppler frequency signals to calculate said distance h according to the formula $h = L[(v/\lambda F_d)^2 - 1]^{\tfrac{1}{2}}$ where L is the distance between the CW laser transmitter and the laser receiver along the fuselage of said aircraft.

16. Apparatus according to claim 15 wherein the CW Laser transmitter uses a CW $CO_2$ laser.

17. Apparatus according to claim 15 wherein the transmitted laser beam is expanded to a fan beam and an array of detector units is provided in said receiver with corresponding optical units whereby each detector has a wide field of view in a vertical plane.

18. Apparatus according to claim 15 including a plurality of detector units provided in said receiver whereby profile information is obtained of one or more objects on the terrain over which the aricraft is flying.

* * * * *

UNITED STATES PATENT AND TRADEMARK OFFICE
CERTIFICATE OF CORRECTION

PATENT NO. : 4,130,360
DATED : December 19, 1978
INVENTOR(S) : Terence H. Courtenay It is certified that error appears in the above—identified patent and that said Letters Patent are hereby corrected as shown below:

Column 3, line 30, equation (6) change "$\frac{\lambda^{1/2}}{kL}$" to $-\left(\frac{\lambda}{kL}\right)^{1/2}-$.

Column 3, line 42, change "K=2  K=4" to --k=2  k=8--.

Column 3, line 65, equation (7) change "$F_d$" to --$F'_d$--.

change "$f_d$" to --$f'_d$--.

Column 4, line 1, equation (8) change "$\frac{F_d}{F_d}$" to --$\frac{F'_d}{F_d}$--.

Column 5, line 52, change "for" to --from--.

Column 6, line 31, change "V" to --v--.

Signed and Sealed this

Eighteenth Day of September 1979

[SEAL]

Attest:

LUTRELLE F. PARKER

Attesting Officer    Acting Commissioner of Patents and Trademarks